United States Patent [19]

Ikeda

[11] Patent Number: 5,648,710

[45] Date of Patent: Jul. 15, 1997

[54] SYSTEM FOR CONTROLLING DRIVE OF STEPPING MOTOR

[75] Inventor: Tetsuhito Ikeda, Machida, Japan

[73] Assignee: Canon Kabushiki Kaisha, Tokyo, Japan

[21] Appl. No.: 557,271

[22] Filed: Nov. 14, 1995

[30] Foreign Application Priority Data

Nov. 16, 1994 [JP] Japan ................... 6-307006
Aug. 25, 1995 [JP] Japan ................... 7-240777

[51] Int. Cl.⁶ ..................................... H02P 8/36
[52] U.S. Cl. ........................... 318/685; 318/696
[58] Field of Search .......................... 318/685, 696

[56] References Cited

U.S. PATENT DOCUMENTS 4,420,717  12/1983  Wallace et al. ................ 318/696
4,587,473   5/1986  Turvey ......................... 318/696
4,683,409   7/1987  Boillat ......................... 318/696
4,851,755   7/1989  Fincher ........................ 318/696
4,959,601   9/1990  Kikugawa ..................... 318/696

*Primary Examiner*—Bentsu Ro
*Attorney, Agent, or Firm*—Fitzpatrick, Cella, Harper & Scinto

[57] ABSTRACT

A drive control system for a stepping motor prevents erroneous operation of a motor drive circuit due to the lack of coincidence between the logic level and an analog 0 voltage. This is accomplished by inhibiting an electric current from flowing by closing a gate circuit until a reference voltage for specifying a drive current into an input terminal reaches a specified voltage with respect to the ground potential, regardless of the output from a comparator to the terminal.

14 Claims, 5 Drawing Sheets

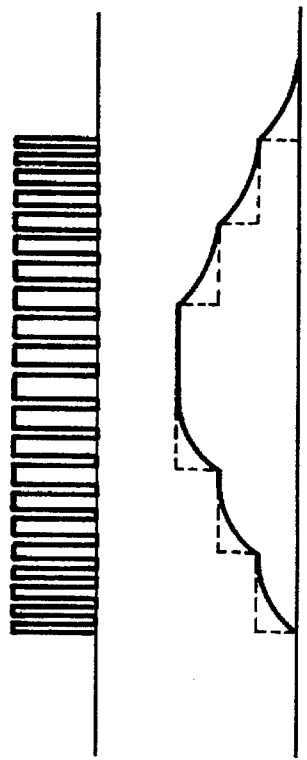
FIG. 4A PWM SIGNAL
FIG. 4B LOW-PASS FILTER OUTPUT
FIG. 5A  A
FIG. 5B  B
FIG. 5C  C
FIG. 5D  D

/ 5,648,710 /

SYSTEM FOR CONTROLLING DRIVE OF STEPPING MOTOR

BACKGROUND OF THE INVENTION

1. Field of the Invention

The present invention relates to a system for controlling driving of a stepping motor, which is arranged to stop erroneous operation of a motor drive circuit employing a constant-current drive circuit.

2. Related Background Art

Recently, applicant proposed in the U.S. application Ser. No. 08/447,753 filed on May 23, 1995 a drive control system for a stepping motor that permits rotation at a high and constant velocity and at high accuracy while avoiding waste power dissipation.

In this application, a PWM unit in an MPU generates a PWM signal associated with a changing duty ratio, a low-pass filter converts a stepped voltage level represented by the changing duty ratio of the PWM signal into a smooth and almost continuous reference voltage, a coil in the stepping motor is excited by a current set for the reference voltage, and the current thus set is maintained by a constant-current drive circuit.

The motor drive circuit in the drive control system for the stepping motor in the above-mentioned application employs a constant-current drive circuit of a type in which the current can be arbitrarily set. This constant-current drive circuit is arranged to maintain the current supplied to the coil in the stepping motor at a constant designated value and to permit the designated current value designated to be arbitrarily set. In further detail, the current supplied to the coil in the motor is set in such a manner that a voltage associated with the current value is detected and the current is maintained constant by controlling an output from a comparator, depending upon whether the voltage thus detected is higher or lower than the reference voltage from the low-pass filter.

In the case of the constant-current drive circuit in the above-mentioned application, the reference voltage from the low-pass filer needs to be set to zero in order to decrease the current supplied to the coil in the motor down to zero. However, even though the reference voltage is set to 0 V, the voltage cannot perfectly reach 0 V [GND (ground) level] because of the output offset of a reference voltage setting circuit, etc. Namely, the PWM unit in the MPU outputs the PWM signal as a logic signal of either a high level or a low level, and the low level signal of the logic signal rarely takes 0 V in practice, but has a voltage of not more than 0.6 V. Because of it, even when the reference voltage is set to 0 V, the reference voltage from the low-pass filter, input into the comparator in the constant-current drive circuit, is not actually 0 V, but a voltage of not more than 0.6 V. This possibly causes the comparator to fail to operate normally. Even though the reference voltage actually reaches the GND level, the comparator could fail to operate normally because of the influence of noise.

The constant-current drive circuit in the previous application is composed of discrete components, and thus, the entire circuit becomes expensive and the area it occupies on a printed board is large. These factors hinder efforts to reduce the cost and size of an apparatus employing a constant-current drive circuit. Moreover, normally, the power is always supplied to the circuit and, in order to lower the dissipation power of the circuit when not driving the motor, separate circuit and control terminals for controlling it in a standby state are provided, which makes the circuitry complicated and which requires extra control lines.

SUMMARY OF THE INVENTION

An object of the present invention is to overcome the above drawbacks and thereby to provide a drive control system for stepping motor arranged so that while an input reference voltage for driving a motor drive circuit does not reach a specified voltage, the input reference voltage is substantially inhibited from being input into the motor drive circuit.

Another object of the present invention is to construct the motor drive circuit of a one-chip IC.

Still another object of the present invention is to provide the system with a standby circuit for controlling the dissipation power of the motor drive circuit.

Other objects of the present invention will become apparent from the description of specific embodiments to follow.

BRIEF DESCRIPTION OF THE DRAWINGS

FIGS. 4A and 4B are waveform diagrams to illustrate a waveform of a voltage applied to a reference voltage input terminal of the constant-current drive circuit of the current-value arbitrary setting type;

FIGS. 5A to 5D are waveform diagrams to show pulse signals applied to selection signal input terminals of the constant-current drive circuit of the current-value arbitrary setting type.

DESCRIPTION OF THE PREFERRED EMBODIMENTS

The embodiments of the present invention will be explained by reference to the drawings.

(Embodiment 1)

Figure 1:
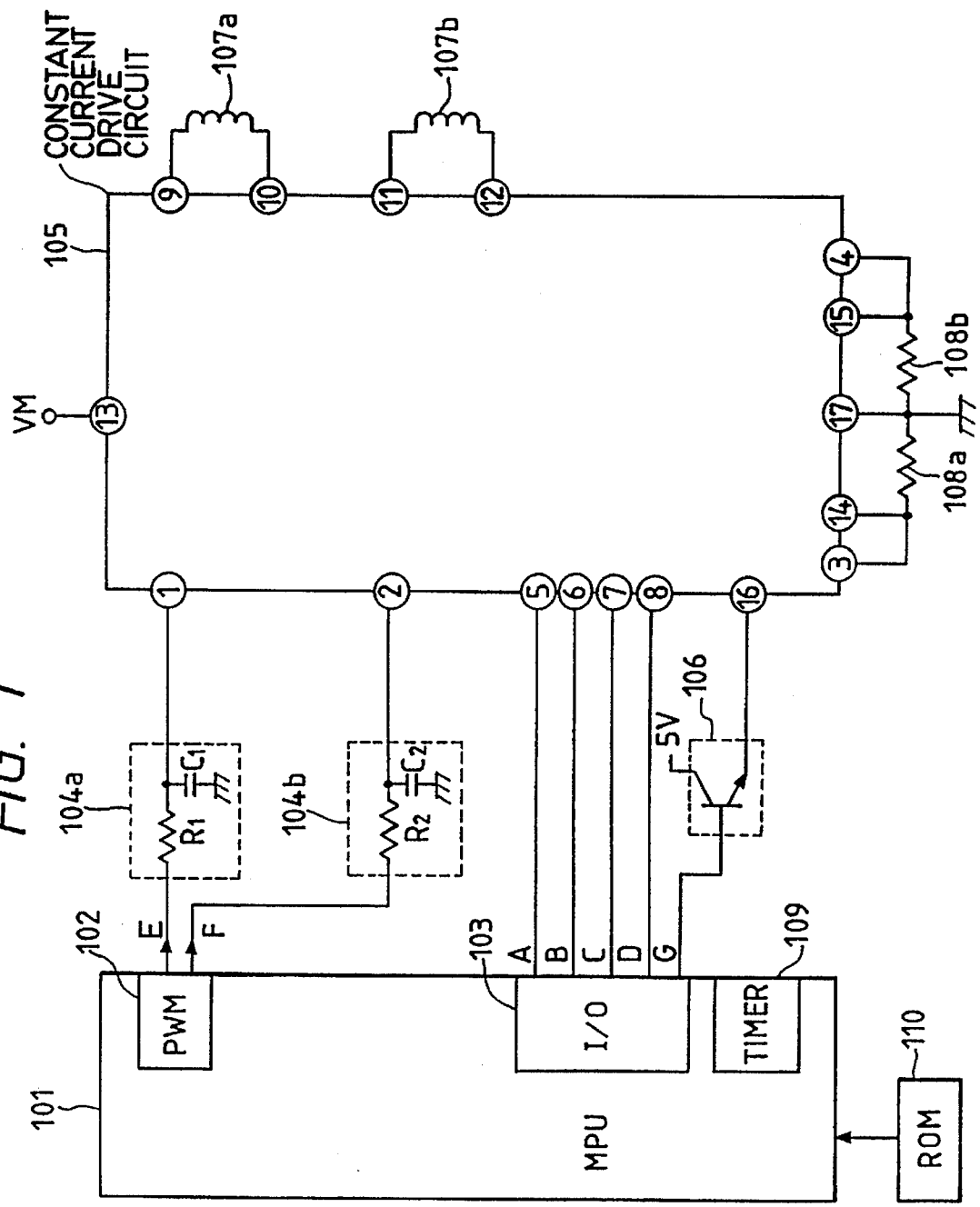
FIG. 1 is a circuit diagram of a stepping motor drive control circuit according to the present invention.

FIG. 1 shows a drive control circuit for stepping motor according to the present invention. In FIG. 1, a micro-controller 101 for controlling the stepping motor includes a built-in PWM unit 102. The PWM unit 102 outputs pulse signals E, F, for each of which the frequency and duty ratio can be set. The micro-controller 101 also includes output ports 103, and the output ports 103 output coded stepping motor control signals (hereinafter referred to simply as control signals) A, B, C, D and standby signal G. The micro-controller 101 further includes a programmable timer unit 109. The timer unit 109 is used, for example, for setting the timing for changing the control signals, i.e., step times, etc. ROM 110 stores data including drive speeds of a motor, the PWM duty ratios, etc.

The pulse signal E, F from the PWM unit 102 is input into a low-pass filter 104a, 104b composed of a resistor R1, R2 and a capacitor C1, C2. The output from the low-pass filter 104a, 104b is input into a constant-current drive circuit 105 as functioning a motor drive circuit.

The constant-current drive circuit 105 is a circuit for letting a current, determined by a voltage input into an input terminal, flow in a motor winding. This function is realized, though detailed later, in such a manner that a comparator compares a voltage determined by current flowing in a sensor resistor 108a, 108b (hereinafter referred to as a detection signal) with a reference voltage input to the input terminal. The current is adjusted by decreasing the current with more current flowing in motor winding 107a, 107b or increasing the current with a less current flowing, and thereby maintaining a constant current, determined by the input voltage value, flowing in the motor winding 107a, 107b, regardless of changes in the power-supply voltage of current-controlled transistors.

Numeral 106 designates a transistor switching circuit arranged to be turned on or off by the standby control signal G. An operation signal according to the on/off operation of this switching circuit 106 is supplied to the constant-current drive circuit 105.

Figure 2:
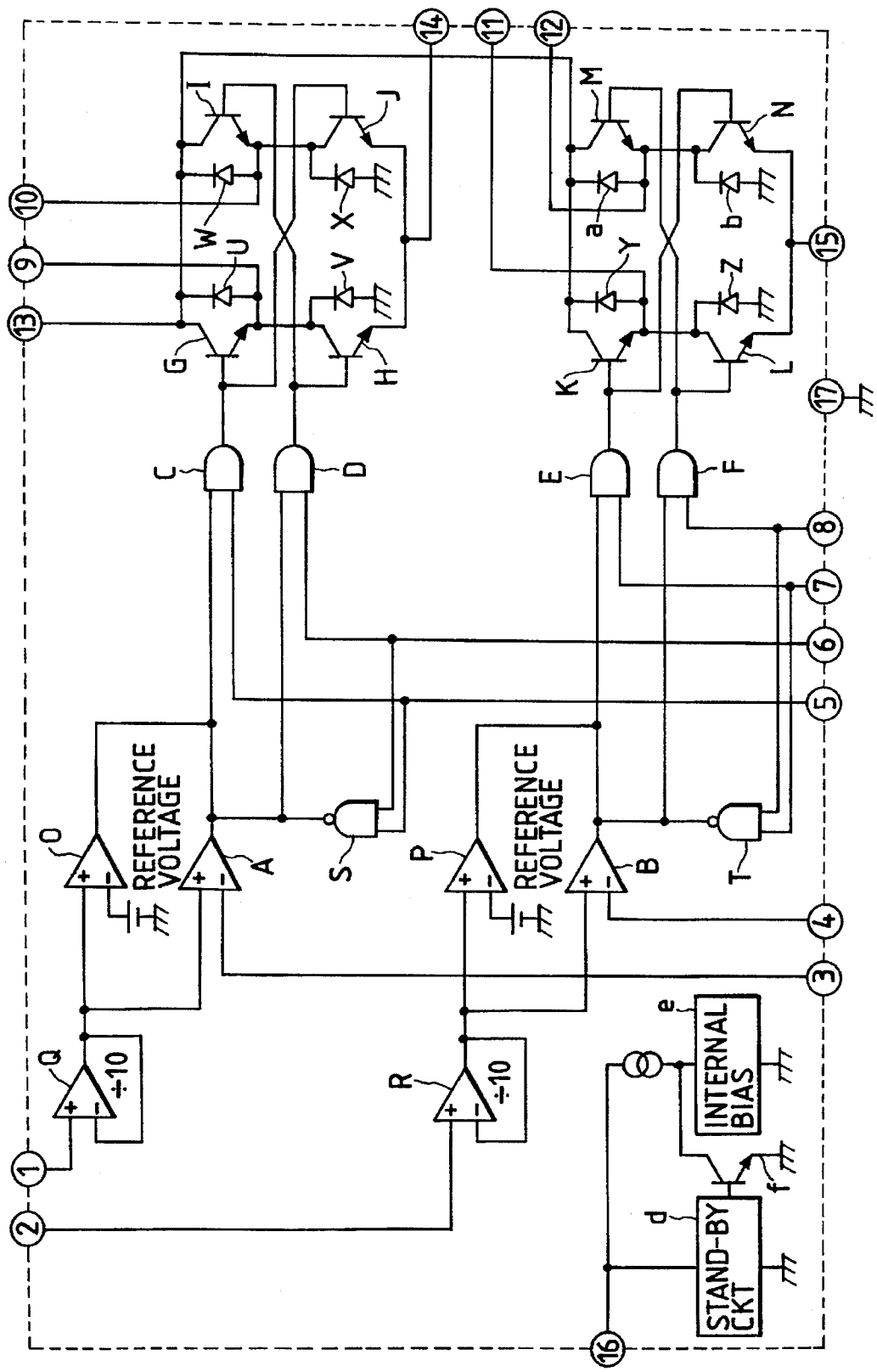
FIG. 2 is a drawing to show a constant-current drive circuit as a motor drive circuit of FIG. 1 to illustrate Embodiment 1 of the present invention.

FIG. 2 shows the constant-current drive circuit 105 (the constant-current drive circuit of the current-value arbitrary setting type) as being the motor drive circuit shown in FIG. 1, and this constant-current drive circuit is constructed of a one-chip IC. In FIG. 2, terminal numbers 1 and 2 represent reference voltage input terminals, 3 and 4 denote current detection signal input terminals, 5–8 denote selection signal input terminals, 9–12 denote drive output terminals, 13 denote a drive power supply (source) terminal, 14 and 15 denote sink terminals, 16 an internal circuit drive power supply terminal, and 17 denotes a GND terminal (ground terminal).

Input into each of the reference voltage input terminals 1 and 2 is a voltage output, for example in a nearly sinusoidal shape (or a square wave shape in some cases) as shown in FIG. 4B, produced through the low-pass filter 104a, 104b from the PWM signal as shown in FIG. 4A. In more detail, the PWM signal generated by the PWM unit 102 in the micro controller 101 shown in FIG. 1 is shaped through the low-pass filter 104a, 104b into a nearly sinusoidal voltage waveform by smoothing stepped portions in the stepped voltage, and the sinusoidal voltage is applied to the reference voltage input terminal 1 or 2. In a normal operation mode of the constant-current drive circuit, a current corresponding to this applied voltage flows in the motor winding 107a, 107b of the stepping motor.

The current value input detection terminal 3 is connected to the sink terminal 14, and the sensor resistor 108a is connected between the sink terminal 14 and the GND terminal 17. The current value detection input terminal 3 is provided for such a purpose that the current flowing in the sensor resistor 108a, that is, the current flowing in the motor winding 107a is detected as a voltage value and the voltage detected is input into an inverting input terminal of comparator A detailed below in order to compare the voltage detected with a voltage input from the reference voltage input terminal 1 (more accurately, a voltage further lowered). Similarly, the current value input detection terminal 4 is connected to the sink terminal 15, and the sensor resistor 108b is connected between the sink terminal 105 and the GND terminal 17. The current value detection input terminal 4 is provided for such a purpose that the current flowing in the sensor resistor 108b, that is, the current flowing in the motor winding 107b is detected as a voltage value and the voltage detected is input into an inverting input terminal of comparator B described below in order to compare the voltage detected with a voltage input from the reference voltage input terminal 2 (more accurately, a voltage further lowered).

Pulse waveforms as shown in FIGS. 5A to 5D are input into the selection signal input terminals 5, 6, 7, 8 to control the turning on and off of AND gates C, D, E, F as detailed later. More specifically, a pulse signal shown by A in FIG. 5A is input into the selection signal input terminal 5, a pulse signal shown by C in FIG. 5C is input into the selection signal input terminal 6, a pulse signal shown by B in FIG. 5B is input into the selection signal input terminal 7, and a pulse signal shown by D in FIG. 5D is input into the selection signal input terminal 8.

The motor windings 107a, 107b are connected between the drive terminals 9 and 10 and between the drive terminals 11 and 12, respectively. Further, the drive power supply is connected to the source terminal 13, and the GND terminal 17 is grounded.

Again referring to FIG. 2, symbols A, B in FIG. 2 denote comparators, each for comparing the reference voltage input thereto with the voltage of current detection signal. An output from the comparator A is input into AND gates C, D and an output from the comparator is input B into AND gates E, F.

Symbols G, H, I, J, K, L, M, N designate npn transistors to function as on/off switches, which are controlled to be on or off by outputs from the AND gates C, D, E, F. Symbols O, P are comparators, each functioning as an inhibiting circuit for keeping the AND gates C, D, E, F off before the reference input voltage reaches a specified voltage. Symbols Q, R are buffer amplifiers for performing impedance conversion of the reference voltage input and multiplying an input level, for example, by 1/10. Symbols S, T are NAND gates, each for closing the AND gates C, D or E, F when the selection signal input terminals 5 and 6 become H (High) simultaneously or when the selection signal input terminals 7 and 8 become H (High) simultaneously, respectively, because of a malfunction. Symbols U, V, W, X, Y, Z, a, b are clamp diodes for canceling counterelectromotive currents caused by the motor coils (windings) 107a, 107b.

Symbol d denotes a standby circuit for turning an internal bias of the drive circuit on or off by turning on or off the internal circuit drive power supply terminal 16, symbol e denotes an internal bias circuit, and symbol f denotes a transistor for turning the internal bias circuit on or off by turning on or off the standby circuit. The operation of this circuit will be briefly described. When the stepping motor is not driven, the switching circuit 106 is turned off by the standby control signal G from the output ports 103 in MPU 101 to turn the internal circuit drive power supply terminal 16 off, thereby cutting the internal bias current. Turning, off the internal circuit drive power supply terminal 16 causes the standby circuit d to cause the base of transistor f to assume the "H" level (High), thereby turning the transistor f on. As a result, the internal bias e goes into a short-circuited state, so that no bias current flows (for example, currents for actuating the comparators A, B and other comparators, AND gates C, D, E, F etc., NAND gates S, T etc. will not flow). Namely, a standby state is achieved.

On the other hand, when the stepping motor is driven, the switching circuit is turned on by the standby control signal G from the output ports 103 in MPU 101 to turn the internal circuit drive power supply terminal 16 on, thereby supplying the internal bias current. Namely, when the internal circuit drive power supply terminal 16 is turned on, the standby circuit d causes the base of transistor f to assume the "L" level (Low) so as to turn the transistor f off. As a result, a current flows in the internal bias e.

As described above, because the standby switching function is interlocked with the internal circuit drive power supply terminal, the number of pins of the IC package can be decreased as compared with cases provided with a dedicated standby terminal.

Next explained is an example of the operation of the constant-current drive circuit according to the present invention. Here, let us assume that when the signal input into the selection signal input terminal 5 is H and the signal input into the selection signal input terminal 6 is L, a value of one tenth of the input voltage input into the reference input voltage terminal 1 is higher than the specified voltage for the comparator 0. Then the output from the comparator 0 is "H". When the value of one tenth of the input voltage input into the reference input voltage terminal 1 is higher than the voltage of the current value detection signal input terminal 3, the output from the comparator A become "H". In this state, because the both inputs into the input terminals of AND gate C are "H", the output of AND gate becomes "H", i.e., and gate C opens, thereby turning the transistor switches G and J on. This causes a current to flow in the motor winding 107a connected between the drive output terminals 9 and 10 in a direction from the drive output terminal 9 toward the output terminal 10. In further detail, the current flows from the drive power supply through the source terminal 13, transistor G, the motor winding (not shown), transistor J, sink terminal 14, and sensor resistor 108a to the GND terminal 17.

The value of the current flowing in the motor winding 107a is detected by the sensor resistor 108a, and a voltage corresponding thereto is applied to the current value detection signal input terminal 3. As the current flowing in the motor winding 107a increases, the value of one tenth of the input voltage input into the reference input voltage terminal 1 comes to be lower than the voltage of the current value detection signal input terminal 3. As a result, the AND gate C closes, thereby turning the transistors G and J off. The off operation of the transistors G and J results in decreasing the current flowing in the sensor resistor 108a and thus again making the value of one tenth of the input voltage input into the reference input voltage terminal 1 higher than the voltage of the current value detection signal input terminal 3. Hereinafter, the AND gate C repeats the on/off operation depending upon whether the voltage of the current value detection signal terminal 3 is lower or higher than the value of one tenth of the input voltage into the reference input voltage terminal 1. Accordingly, the current flowing in the sensor resistor 108a, that is, the current flowing in the motor winding 107a is determined by the value of one tenth of the input voltage input into the reference input voltage terminal 1, in other words, by the input voltage input into the reference input voltage terminal 1. Of course, a change in the value of input voltage input into the reference input voltage terminal 1 also changes the current flowing in the motor winding 107a, depending thereupon. As described above, this circuit is a constant-current drive circuit of the current-value arbitrary setting type capable of arbitrarily setting a value of the current flowing in the motor winding 107a by a value of the voltage applied to the reference input terminal and capable of maintaining the current at the value set, that is, maintaining the current constant.

Figure 6:
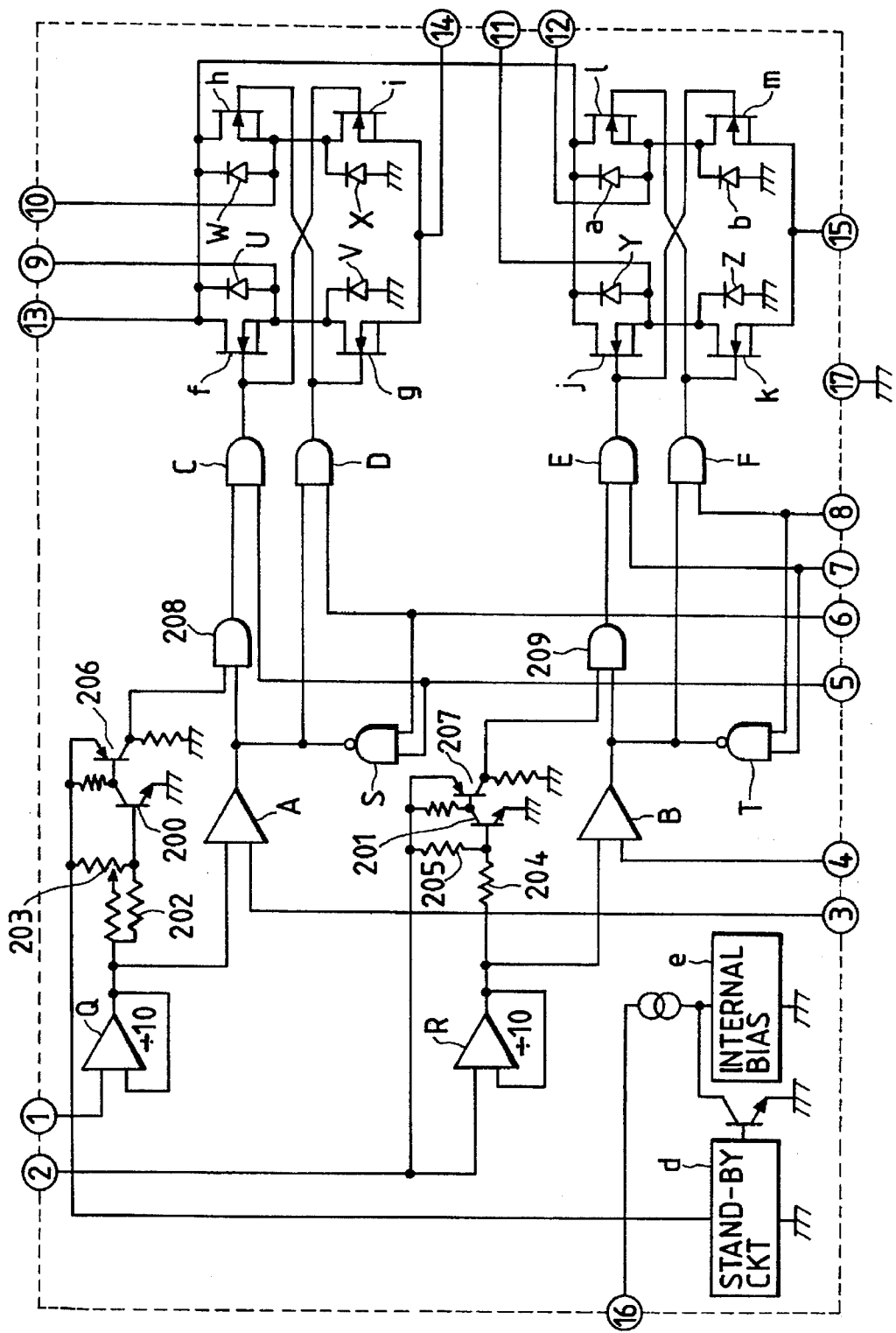
FIG. 6 is a drawing to show a constant-current drive circuit as a motor drive circuit including an inhibiting circuit, which is used as a substitute for a comparator in Embodiment 1 of the present invention.

The above description is directed to the case where the value of one tenth of the input voltage into the reference input voltage terminal 1 is higher than the specified voltage for the comparator 0, but, in the case where the value of one tenth of the input voltage input into the reference input voltage terminal 1 is lower than the specified voltage for the comparator 0, the output from the comparator 0 becomes "L", so that the AND gate C does not open even if the value of one tenth of the input voltage input into the reference input voltage terminal 1 is higher than the voltage of the current value detection signal input terminal 3. Therefore, by such an arrangement that the specified voltage of the comparator 0 is determined so as to be larger than either a higher level out of the offset voltage upon output of "0 V" from the reference voltage generating circuit and the level of noise that could be a cause of the occurrence of a malfunction, the drive current can be surely switched off when the reference voltage input is set at "0 V". Further, the construction as shown in FIG. 6 can also realize an inhibiting circuits for keeping the AND gates C, D, E, F off before the reference input voltage reaches the specified voltage. Each of npn transistors 200, 201 is normally turned on when the base voltage reaches about 0.6 V. The voltage for turning the transistor 200 or 201 on can be arbitrarily set by the ratio of resistors 202, 203 or resistors 204, 205, respectively. Since next-stage transistor 206, 207 are turned on with turning on of the npn transistor, the input of AND gate 208, 209 assumes the H level. When the transistor 206, 207 are in an off state, the input of the AND gate is L, thus functioning as an inhibiting circuit for stopping the motor current.

(Embodiment 2)

Figure 3:
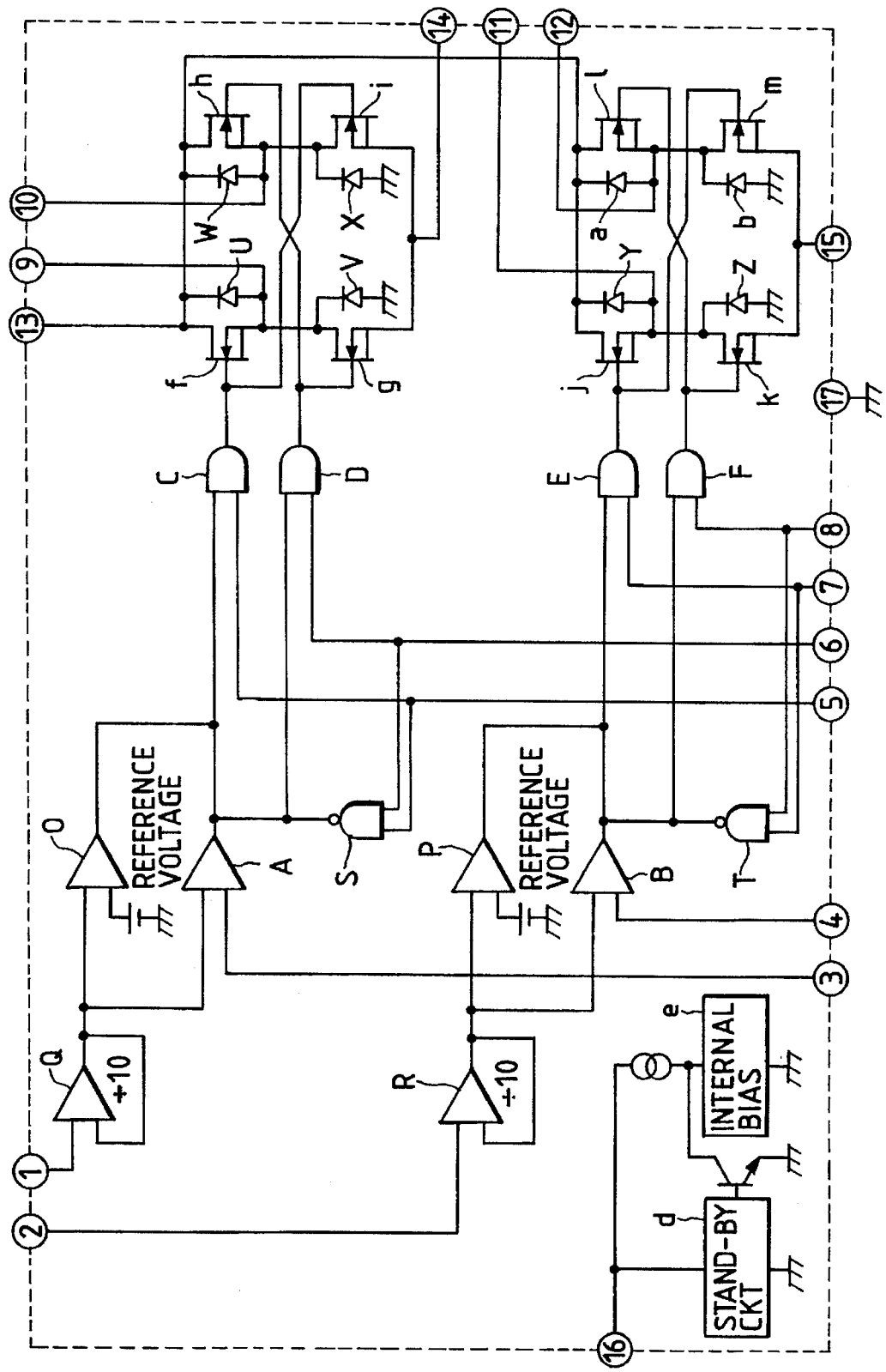
FIG. 3 is a drawing to show another constant-current drive circuit as a motor drive circuit of FIG. 1 to illustrate Embodiment 2 of the present invention.

FIG. 3 is a drawing to show a constant-current drive circuit arranged in an IC form in Embodiment 2 of the present invention. In Embodiment 1 the npn transistors G, H, I, J, K, L, M, N were used as on/off switches. Since a driving IC requiring drive with a large current is arranged to let the current flow to a drive load, the large current flows through the switches. A problem of heat generation would thus occur if the switches were constructed with transistors. In order to solve this problem, Embodiment 2 employs FETs as switches, as shown in FIG. 3, instead of the npn transistors. Since other aspects of its constitution and operation are the same as those in Embodiment 1, the description thereof is omitted herein.

As explained above, the comparator for input of the reference voltage for determining the drive current (motor winding current) is arranged so that the gate circuit is closed until the reference voltage input reaches the specified voltage relative to the GND potential, thereby inhibiting the drive current from flowing, which can surely cut the drive current when the reference voltage is set at "0 V".

When the constant-current circuit of the current value arbitrary setting type is constructed in the one-chip IC form, the entire circuit becomes cheaper, the occupying area becomes smaller on the printed board, and low cost and compact apparatus employing this constant-current circuit can be achieved, as compared with the cases constructed of discrete components as in the conventional example.

Further, a system has the circuit drive power supply for driving the internal circuit separately from the drive power supply terminal for supplying the current to the drive load. The system is constructed so as to have both the functions of a circuit drive power supply terminal and the function of standby switching, whereby in synchronization with turning on/off of the circuit drive power supply, the normal operation mode is selected when it is on, while the standby mode for controlling the dissipation power of the internal drive circuit is selected when it is off. This arrangement can cut the internal bias current by selecting the standby mode when the load is not driven, thereby stopping the waste dissipation current. The interlocking arrangement of the standby switching function with the internal circuit drive power supply terminal can decrease the number of pins of the IC package, as compared with the case of providing a dedicated standby terminal.

What is claimed is:

1. A drive control system for a stepping motor comprising:
   a stepping motor;
   pulse signal generating means for generating a pulse signal;
   converting means for converting a voltage level of the pulse signal generated by said pulse signal generating means into a smooth and substantially continuous reference voltage; and
   drive means for exciting an excitation coil in said stepping motor by an electric current set according to the reference voltage from said converting means, said drive means comprising inhibiting means for maintaining the set electric current while comparing the reference voltage with a detection voltage obtained in correspondence to the set current in a comparator, and inhibiting the comparator from producing an output until the reference voltage reaches a specified voltage.

2. The drive control system for a stepping motor according to claim 1, wherein said drive means is comprised of a one-chip IC comprising constant-current drive means for maintaining the set current at a constant current.

3. The drive control system for a stepping motor according to claim 1, wherein said drive means further comprises detecting means for detecting the detection voltage obtained in correspondence to the set current, said drive means maintaining the set current while comparing the reference voltage with the detection voltage of said detecting means in said comparator.

4. The drive control system for a stepping motor according to claim 1, further comprising step drive signal generating means for applying a step drive signal to said drive means to step-drive said stepping motor, wherein said pulse signal generating means divides the duration of one drive step of said stepping motor into a plurality of sections and generates pulses with respective duties set for their associated sections.

5. A drive control system for a stepping motor comprising:
   a stepping motor;
   a PWM unit for generating a PWM signal associated with a changing duty ratio;
   a low-pass filter for receiving the PWM signal from said PWM unit and for converting a stepped voltage level represented by the changing duty ratio of the PWM signal into a smooth and substantially continuous reference voltage signal; and
   a constant-current drive circuit for exciting an excitation coil in said stepping motor by an electric current set according to the reference voltage signal from said low-pass filter, said constant-current drive circuit having, in order to maintain the set current in correspondence to a voltage of the reference voltage signal, a first comparator to one input of which the reference voltage signal is input and to the other input of which a detection voltage obtained in correspondence to the current is input, said first comparator comparing the reference voltage signal with the detection voltage, and said constant current drive circuit further having an inhibiting circuit for inhibiting said first comparator from producing an output until the reference voltage signal reaches a specified voltage.

6. The drive control system for a stepping motor according to claim 5, wherein said constant-current drive circuit is provided with a buffer amplifier for the reference voltage signal input thereinto, said buffer amplifier having an impedance changing function for increasing the input impedance of the reference voltage signal and an amplifying function for amplifying the reference voltage signal a specified number of times.

7. The drive control system for a stepping motor according to claim 5, wherein said inhibiting circuit is a second comparator different from said first comparator.

8. A drive control system for a stepping motor comprising:
   a stepping motor;
   a bridge circuit for connecting an excitation coil in said stepping motor between output terminals and letting an electric current flow in a normal or reverse direction in the excitation coil through the switch operation of plural pairs of switches;
   a control circuit for generating a PWM signal associated with a changing duty ratio, and a selection signal;
   a low-pass filter for receiving the PWM signal from said control circuit and converting a stepped voltage level represented by the changing duty ratio of the PWM signal into a smooth and substantially continuous reference voltage signal;
   a comparator to which the reference voltage signal from said low-pass filter is input and to which a detection voltage obtained in correspondence to the electric current in the excitation coil is input, said comparator comparing the reference voltage signal with the detection voltage;
   a plurality of gate circuits to which the selection signal is input in order to select the operation of said plural pairs of switches; and
   an inhibiting circuit for inhibiting said plurality of gate circuits from operating until the reference voltage signal reaches a specified voltage, wherein after said inhibiting circuit stops its inhibiting operation, said plurality of gate circuits enable the operation of said plural pairs of switches by an output from said comparator when the detection voltage is lower than the reference voltage signal, but disable the operation of said plural pairs of switches by an output from said comparator when the detection voltage is higher than the reference voltage signal.

9. The drive control system for a stepping motor according to claim 8, wherein said bridge circuit, said comparator, said plurality of gate circuits, and said inhibiting circuit together comprise a motor drive circuit comprising a one-chip IC.

10. The drive control system for a stepping motor according to claim 8, wherein said plural pairs of switches in said bridge circuit comprise four switches connected to a sink side and a source side of a drive current of said excitation coil, said four switches comprising two pairs of switches in which a sink-side switch connected to one of said output terminals is paired with a source-side switch connected to the other of said output terminals and in which a source-side switch connected to the one of said output terminals is paired with a sink-side switch connected to the other of said output terminals.

11. The drive control system for a stepping motor according to claim 10, wherein said plurality of gate circuits comprises two gate circuits to which two associated selection signals each are input from said control circuit and wherein outputs of said two gate circuits each are connected to said two pairs of switches so as to selectively turn said pairs of switches on or off by the selection signals.

12. The drive control system for a stepping motor according to claim 11, wherein when said two pairs of switches are simultaneously selected by said two associated selection signals, wherein said two gate circuits are arranged to turn said pairs of switches off.

13. The drive control system for a stepping motor according to claim 10, wherein said bridge circuit connects a diode having a normal direction of from said output terminals to a drive power supply and a diode having a normal direction of from the ground to said output terminals.

14. A drive control system for a stepping motor comprising:

a stepping motor;

pulse signal generating means for generating a pulse signal;

a conversion circuit for converting a voltage level of the pulse signal generated from said pulse signal generating means into a smooth and substantially continuous reference voltage; and a constant-current drive circuit for exciting an excitation coil in said stepping motor by an electric current set in accordance with the reference voltage from said conversion circuit, said constant-current drive circuit having, in order to maintain the set electric current in accordance with the reference voltage, a comparator to one input of which the reference voltage is input and to the other input of which a detection voltage obtained in accordance with the electric current is input, said comparator comparing the reference voltage with the detection voltage, and said constant-current drive circuit further having an inhibiting circuit for inhibiting said comparator from producing an output until the reference voltage reaches a specified voltage, wherein said constant-current drive circuit is comprised of a one-chip IC also comprising said comparator and said inhibiting circuit, and wherein said one-chip constant-current drive circuit has an internal circuit drive power supply terminal for letting an electric current for actuating said comparator and said inhibiting circuit flow, separately from terminals for drive power supply for letting the electric current flow in said excitation coil, said internal circuit drive power supply terminal also being used as an actuating terminal of a standby circuit for controlling power dissipation of an internal drive circuit.

* * * * *

UNITED STATES PATENT AND TRADEMARK OFFICE
CERTIFICATE OF CORRECTION

PATENT NO. : 5,648,710
DATED : July 15, 1997
INVENTOR(S) : TETSUHITO IKEDA

It is certified that error appears in the above-identified patent and that said Letters Patent is hereby corrected as shown below:

COLUMN 2:
 Line 4, "for" should read --for a--.

COLUMN 4
 Line 17, "is input B" should read --B is input--.

COLUMN 4:
 Line 45, "Turning," should read --Turning--.

COLUMN 6:
 Line 49, "achieved , as" should read --achieved, as--.

Signed and Sealed this

Twenty-fourth Day of February, 1998

Attest:

BRUCE LEHMAN

Attesting Officer          Commissioner of Patents and Trademarks